UNITED STATES PATENT OFFICE.

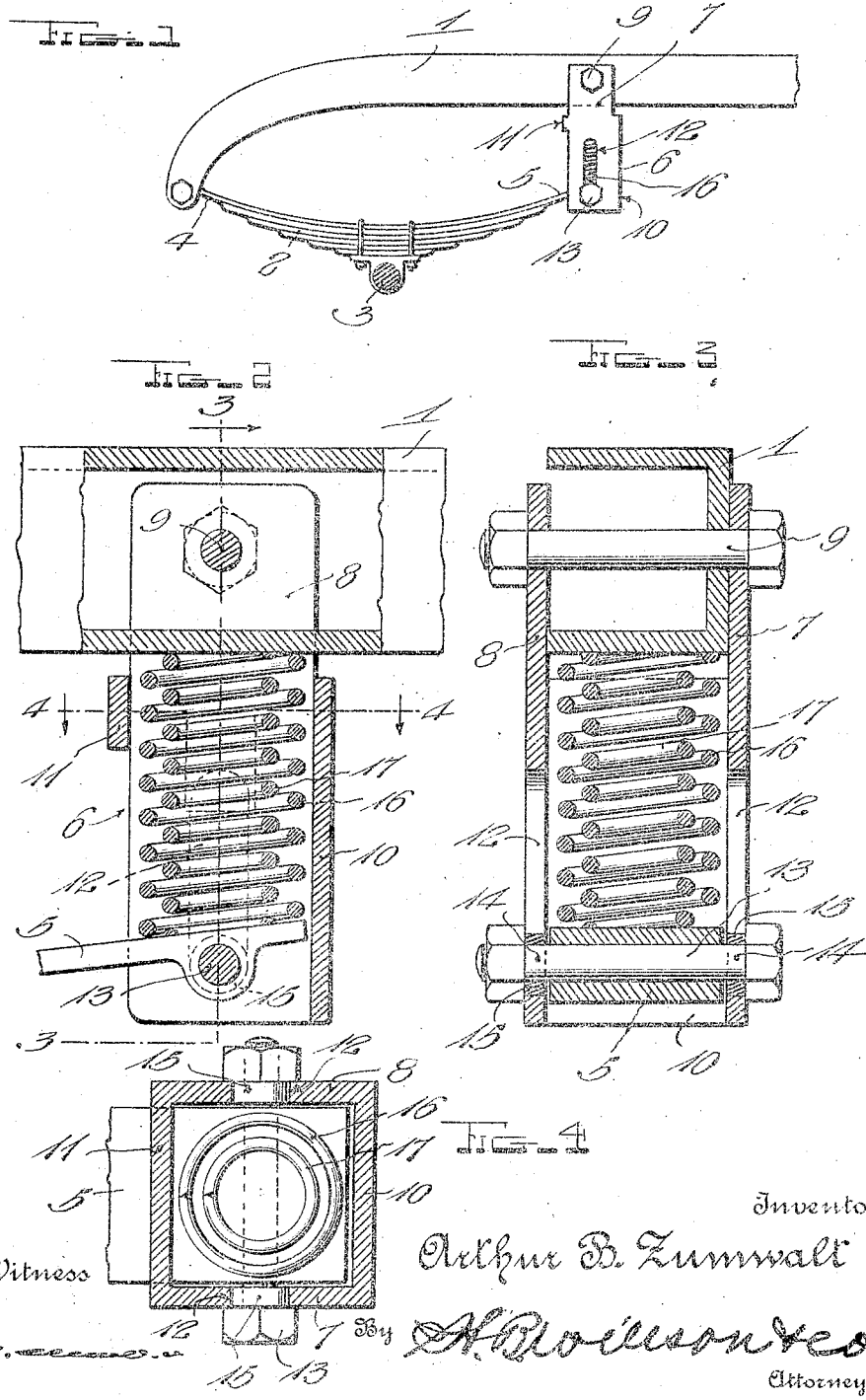

ARTHUR B. ZUMWALT, OF FULTON, CALIFORNIA.

SHOCK-ABSORBER.

1,226,434.  Specification of Letters Patent.  Patented May 15, 1917.

Application filed November 9, 1916. Serial No. 130,404.

*To all whom it may concern:*

Be it known that I, ARTHUR B. ZUMWALT, a citizen of the United States, residing at Fulton, in the county of Sonoma and State of California, have invented certain new and useful Improvements in Shock-Absorbers; and I do declare the following to be a full, clear, and exact description of the invention, such as will enable others skilled in the art to which it appertains to make and use the same.

This invention relates to new and useful improvements in shock absorbers and the primary object of the invention is to provide a device of this character which may be attached to a vehicle, preferably to any ordinary automobile, and which will absorb the shocks and vibrations and cushion the connection between the spring and frame of the vehicle.

Another object of the invention is to provide a device of this character which is easily and simply constructed, inexpensive to manufacture, and one which will be very efficient in operation.

With these and numerous other objects in view, my invention consists of the novel features of construction, combination and arrangement of parts which will be hereinafter referred to and more particularly pointed out in the specification and claim.

In the accompanying drawings:

Figure 1 is a side elevation showing the shock absorber applied to the rear end of the spring of a vehicle;

Fig. 2 is a vertical section of the shock absorber;

Fig. 3 is a vertical section on the line 3—3 of Fig. 2;

Fig. 4 is a horizontal section on the line 4—4 of Fig. 2.

In describing my invention I shall refer to the drawing in which similar reference characters designate corresponding parts throughout the several views. In Fig. 1 I have shown my shock absorber applied to the rear end of a vehicle, the numeral 1 designating the frame and the numeral 2 the supporting spring which is secured to the axle 3. This supporting spring 2 is connected at one end 4 with the rear end of the frame, while the free end of the same which is designated by the numeral 5 is connected with the shock absorber.

The shock absorber which is designated by the numeral 6 comprises a housing which forms a shackle that connects the free end 5 of the spring with the frame 1. This housing is formed with two parallel side members 7 and 8 which have their upper ends extending a short distance upwardly along the opposite sides of the frame 1, and are pivotally connected therewith by a bolt 9 which extends therethrough as clearly shown in Fig. 3 of the drawing.

The front edges of the sides 7 and 8 are connected by a front plate 10 which extends from the bottom of the same to a point adjacent its top. The upper edge of this front plate 10 when in position is disposed a short distance beneath the bottom of the frame 1 for a purpose to be hereinafter more fully described. The rear edges of the sides 7 and 8 are connected by a back strip 11 which has its upper edge disposed in a single plane with the upper edge of the front plate and which extends across the rear edges of the sides of the housing adjacent the top of the same, so that the rear side of said housing is left open. The sides 7 and 8 of the housing are provided with alining longitudinally extending slots 12 for a purpose to be hereinafter more fully described.

The free end 5 of the supporting spring 2 is positioned within the housing adjacent the bottom of the same through its open side, and this end of the spring has projecting laterally therethrough a bolt 13 which is provided with projecting ends 14 which extend from the opposite sides of the spring and which are slidably positioned through the slots 12 in the sides of the housing. These projecting ends 14 of the bolts have wear rings 15 thereon that engage the opposite sides of the slots when the projecting ends move therealong.

Positioned within the housing 6 is a pair of coiled springs 16 and 17 positioned one within the other which have their lower ends positioned on the free end 5 of the spring, while their upper ends are positioned against the bottom of the frame 1. These springs will hold the free end of the supporting spring spaced from the bottom of the frame and will also take up all vibration and shocks as the free end of the spring is allowed to move upwardly in the housing against the tension of these springs upon any severe shock, etc.

In operation the housing forms a shackle which is positioned between the frame 1 and the free end of the supporting spring 2, and the coiled springs within this housing will form the tensioning means that absorb all shocks, vibrations, etc., between the supporting spring and the axle. The projecting ends of the bolt at the end of the supporting spring slide freely within the slots in the opposite sides of the housing and the brass wear rings on these projecting ends will protect the same as is obvious.

The longitudinal slots 12 in the side members of the housing are positioned adjacent the bottom of the same and extend upwardly approximately a short distance less than half the length of these members so that in case the springs 16 and 17 should break, the free end of the supporting spring would not be projected up against the bottom of the frame, but will be held by the projecting ends of the bolt in the top portions of these slots. Also, the upper ends of the front plate 10 and the rear strip 11 that connect the opposite front and rear edges of the side members of the housing are positioned a short distance below the bottom of the frame 1 when the housing is in position, so that the housing may oscillate to accommodate itself to the movement of the leaf spring when the vehicle passes over an obstruction.

From the foregoing description of the construction and operation of my shock absorber, the manner of applying the same to use and the operation thereof will be readily understood and it will be seen that I have provided a simple and efficient means for carrying out the objects of this invention. The housing 6, if desired, may be cast in one piece, or the various parts are made separately.

I claim:

The combination with a leaf spring adapted to be connected intermediate its ends to an axle, one end of said spring being connected with one end of a vehicle frame, and a spring connection on the other end of the leaf spring adapted to be connected to the frame of a vehicle, said spring connection comprising a casing pivotally connected to said frame and having one side and its top open, the opposite sides of the casing having alined longitudinally extending slots therein, the end of the leaf spring adapted to be slidably positioned in said casing through its open side, an integral depending bearing on said spring with its ends alined with the slots in the sides of the casing, a bolt carried by said bearing with projecting ends positioned through said slots and adapted to slide therein, wire rings surrounding said ends and adapted to engage the sides of the slots, and a pair of coiled springs disposed one within the other in the casing and having one end resting on the end of the leaf spring and the other against the bottom of the frame.

In testimony whereof I have hereunto set my hand in the presence of two subscribing witnesses.

ARTHUR B. ZUMWALT.

Witnesses:
Ross Campbell,
Hardin T. Chenoweth.